United States Patent [19]

Krimm et al.

[11] 4,330,665

[45] May 18, 1982

[54] PROCESS FOR THE PREPARATION OF AROMATIC POLYCARBONATES

[75] Inventors: Heinrich Krimm; Hans-Josef Buysch, both of Krefeld; Hans Rudolph, Leverkusen, all of Fed. Rep. of Germany

[73] Assignee: Bayer Aktiengesellschaft, Leverkusen, Fed. Rep. of Germany

[21] Appl. No.: 256,227

[22] Filed: Apr. 21, 1981

[30] Foreign Application Priority Data

May 7, 1980 [DE] Fed. Rep. of Germany ....... 3017419

[51] Int. Cl.$^3$ .............................................. C08G 63/62
[52] U.S. Cl. ................................................... 528/200
[58] Field of Search ........................................ 528/200

[56] References Cited

U.S. PATENT DOCUMENTS 4,182,726  1/1980  Illuminati et al. .................. 260/463

FOREIGN PATENT DOCUMENTS 2736062  2/1979  Fed. Rep. of Germany .
2736063  2/1979  Fed. Rep. of Germany .

*Primary Examiner*—Maurice J. Welsh
*Attorney, Agent, or Firm*—Gene Harsh; Lawrence S. Pope; Aron Preis

[57] ABSTRACT

The invention is directed to a process for the preparation of polycarbonates of $\overline{M}w$ 20,000 to 180,000 by transesterification of diphenols and carbonic acid dialkyl esters in the presence of organo-tin-IV compounds and a monophenol.

8 Claims, No Drawings

PROCESS FOR THE PREPARATION OF AROMATIC POLYCARBONATES

FIELD OF THE INVENTION

The invention relates to a process for preparing polycarbonates and to transesterification in particular.

SUMMARY OF THE INVENTION

The present invention relates to a process for the preparation of high molecular aromatic polycarbonates with a $\overline{M}_n$ (weight-average molecular weight) of 20,000 to 180,000, preferably of 30,000 to 120,000 by transesterification of diphenols with carbonic acid dialkyl esters in the presence of organo-tin-IV compounds, which process is characterized in that the transesterification is carried out in the presence of a monophenol.

DESCRIPTION OF THE PRIOR ART

The preparation of aromatic carbonic acid esters by transesterification of dialkyl carbonates with phenols in the presence of organo-tin compounds as transesterification catalysts is known from DE-OS (German Published Specification) No. 2,736,062. Instead of monohydric phenols, it is possible to use bisphenols and thus obtain polycarbonates (see page 6 of the German Published Specification).

The preparation of aromatic carbonic acid esters by transesterification of dimethyl carbonate with phenols in the presence of transesterification catalysts is known from DE-OS (German Published Specification) No. 2,736,063, mixtures of dimethyl carbonate/methanol and methanol-immiscible agents which form an azeotrope with methanol being used, and the methanol-/azeotrope-forming agent mixture are distilled off during the reaction. Instead of monohydric phenols, it is possible to employ bisphenols (see page 4 of the German Published Specification), and organo-tin compounds can also be used as the transesterification catalysts.

The preparation of aromatic carbonic acid esters by transesterification of phenols or acyl esters thereof with alkyl carbonates or cyclic carbonates or aryl alkyl carbonates in the presence of catalysts is known from DE-OS (German Published Specification) No. 2,528,412. Tin tetrahalides or tin tetra-oxy compounds in addition to many other compounds, can be used as the catalysts (page 2 of the German Published Specification). It is also possible to employ bisphenols as the phenols, polymeric aromatic carbonates with a molecular weight of, for example, 17,000 being obtained.

DETAILED DESCRIPTION OF THE INVENTION

Organo-tin-IV compounds of the general formula (1)

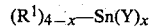  (1)

in which
Y represents an O—CO—$R^2$, OH or an $OR^2$ radical, wherein
$R^2$ denotes a $C_1$-$C_{12}$-alkyl radical, a $C_6$-$C_{12}$-aryl radical or a $C_7$-$C_{13}$-aralkyl radical,
$R^1$ has the meaning of $R^2$, and
x denotes an integer from 1 to 3, or dialkyl-tin oxides wherein alkyl radical is of 1–12 C atoms or organo-tin compounds of the general formula (2)

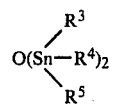  (2)

in which
$R^3$ and $R^4$ independently denote the meanings of $R^2$ and
$R^5$ has the meaning of $R^2$ or represents a radical $OR^6$, in which
$R^6$ has the meaning of $R^2$,
are particularly suitable for the process according to the invention.

Examples of organo-tin-IV compounds which are particularly suitable for the process are: diethoxydimethyl-tin, dibutoxydimethyl-tin, diisooctoxydimethyl-tin, dimethoxydiethyl-tin, diethoxydiethyl-tin, dibutoxydiethyl-tin, diisooctoxydiethyl-tin, dimethoxydibutyl-tin, diethoxydibutyl-tin, dibutoxydibutyl-tin, diphenoxydibutyl-tin, triethoxymethyl-tin, tributoxymethyl-tin, triisooctoxymethyl-tin, trimethoxyethyl-tin, triethoxyethyl-tin, tributoxyethyl-tin, triisooctoxyethyl-tin, trimethoxybutyl-tin, triethoxybutyl-tin, tributoxybutyl-tin and triisooctoxybutyl-tin, and furthermore, dimethyl-tin oxide, diethyl-tin oxide and dibutyl-tin oxide.

Dialkyl carbonates which may be used according to the invention are those of the general formula (3)

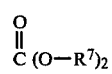  (3)

in which $R^7$ represents a $C_1$-$C_{10}$-alkyl radical. Although the dialkyl carbonates of higher alcohols are entirely suitable starting substances for the reaction according to the invention, it is preferable to use dimethyl carbonate or diethyl carbonate in view of the fact that they are readily accessible by a phosgene-free route and in that the rate of their transesterification is higher.

Diphenols which may be suitable according to the invention are those of the formula (4)

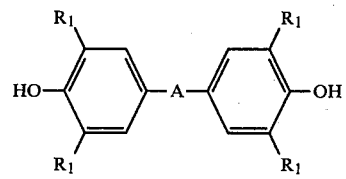  (4)

where
$R_1$ denotes either of H, $C_1$-$C_4$-alkyl or Cl and
A denotes either of $C_1$-$C_5$-alkylene, $C_2$-$C_5$-alkylidene, $C_5$-$C_6$-cycloalkylene, $C_5$-$C_6$-cycloalkylidene or O or S.

Examples of diphenols which may be suitable for the process of the invention are: dihydroxydiarylalkanes such as 2,2-bis-(4-hydroxyphenyl)-propane (bisphenol A), 2,2-bis-(4-hydroxyphenyl)-butane and 1,1-bis-(4-hydroxyphenyl)-cyclohexane and also bis-(4-hydroxyphenyl)-ether and bis-(4-hydroxyphenyl)-sulphide.

Monophenols which may be suitable according to the invention are of the formula (5)

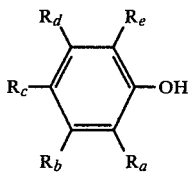

where $R_a$–$R_e$ independently denote H, $CH_3$, ethyl, cyclohexyl, phenyl or Cl.

Among the monophenols which may be used in the practice of the invention are: phenol, o,m,p-cresol, o,m,p-chlorophenol, o,m,p-ethylphenol, 2,6-dimethylphenol, 2,4-dimethylphenol, p-cyclohexylphenol and p-phenylphenol.

The organo-tin-IV compounds may be used in concentrations of about 0.001% by weight to about 10% by weight, preferably from 0.01% by weight to 1% by weight, in each case relative to the total weight of the reactants.

The amounts of the organo-tin-IV compounds are preferably selected such that the properties of the polycarbonate products are not impaired, that is to say that the content of tin in the reaction product is not more than 0.5% by weight.

The monophenol to be added according to the invention may be used in amounts of about 0.1 to 10 mols, preferably 1 to 5 mols, per mol of diphenol employed in each case.

The dialkyl carbonate is preferably used in excess, and preferably in amounts between 1.2 and 10 mols per mol of diphenol employed. It may be expedient to introduce some of the dialkyl carbonate into the reaction by dropwise addition at a rate such that a sufficiently high reaction temperature can be maintained.

The reaction temperature is in the range of from 100° to 250° C., preferably between 120° and 200° C.

The pressure is preferably 1 atmosphere and must be reduced to about 0.001 to 50 mm Hg, preferably to about 0.01 to 0.1 mm Hg, during the last stage of the reaction.

In a preferred procedure, the transesterification mixture is brought to the desired reaction temperature of, for example, 150° C. on a column about 2 m long, which is easily possible by regulating the amount of dialkyl carbonate in the reaction mixture and the alcohol is separated off over the top, at the rate at which it is liberated in the reaction mix, if necessary with the aid of an inert gas stream or of an agent which forms an azeotrope with the alcohol.

As soon as the amount of alcohol calculated theoretically from the OH groups of the diphenol has been separated off, the excess of dialkyl carbonate, which is present in the reaction mixture (as free dialkyl carbonate or is bonded as phenylalkyl carbonate or diphenolethyl carbonate or in the form of alkyl carbonate end groups of oligomeric polycarbonates) is distilled off under reduced pressure, the pressure being continuously reduced.

Finally, the entire amount of monophenol introduced is removed by stepwise increase in the reaction temperature up to 270° and reduction in the pressure to between 0.1 mm Hg and 0.01 mm Hg, the increase in viscosity of the polycarbonate indicating its transition into the high molecular state.

In yet another procedure, the dialkyl carbonates are passed through a melt of the bisphenols and monophenol and the catalyst at the reaction temperature in a manner such that a mixture of the alcohol in question and the dialkyl carbonate is removed, if appropriate over a column. This operation is continued until an amount of alcohol equivalent to the amount of bisphenol employed has been separated off. Removal of the excess dialkyl carbonate and excess monophenol and conversion of the reaction product into the high molecular state are carried out as in the procedure described above.

The advantage of the simultaneous use of monophenol according to the invention is that the high molecular state is achieved with certainty and that a considerably shorter time than is possible without the addition of monophenol is required.

The process products can be further processed in known manners into films sheets, coatings and shaped articles of the most diverse nature.

The invention is further illustrated, but is not intended to be limited by the following Examples in which all parts and percentages are by weight unless other specified.

EXAMPLES

EXAMPLE 1

456 g (2 mols) of bisphenol A, 376 g (4 mols) of phenol, 708 g (8 mols) of diethyl carbonate and 1 g of ethyltin triisooctylate are heated under reflux using a 2.3 m high mirrored packed column, charged with glass rings of 5 mm in diameter while stirring and passing over dry nitrogen, during which ethanol is taken off over the top at 78° to 80° C. After 23 hours, the internal temperature has risen from an initial 153° to 180° C. Diethyl carbonate is added dropwise in the middle of the column in the course of 20 hours at a rate such that the reaction temperature is kept at 180° C. 236 g (2 mols) of diethyl carbonate are required. After a reaction time of 42 hours, splitting off of alcohol ceases. 291 g=6.3 mols of ethanol have been distilled off. The apparatus is connected to a waterpump. The pressure is reduced gradually (from 300 mm Hg to 140 mm Hg) at a bottom temperature of 180° C. in a manner such that the temperature at which the distillate passes over does not exceed 100° C. After 20 hours, 430 g of a distillate consisting of diethyl carbonate and ethanol have been separated off. The residue weighs about 923 g.

50 g of this residue are first heated to 190° C. under 100 mm Hg, under nitrogen in a 100 ml round-bottomed flask equipped with a metal stirrer, until the splitting off of phenol starts. The bath temperature is brought to 250° C. in the course of 50 minutes. The temperature at which the distillate passes over is between 121° and 137° C. The pressure is reduced to 14 mm Hg in the course of 30 minutes and is kept at this level for 40 minutes. The reaction is brought to completion in the course of 4 hours, starting at a bath temperature of 200° C. and under a pressure of 0.03 mm Hg, the temperature being increased to 270° C. The reaction product has then become so viscous that it can be stirred only slowly.

The residue, which is a light-colored, clear, viscous polycondensation product from which filaments of considerable strength can be drawn weighs 20.7 g. The molecular weight, determined by the light scattering method, is 56,000.

EXAMPLE 2

2,000 g of dimethyl carbonate are passed through a melt of 228 g (1 mol) of bisphenol A, 235 g (2.5 mols) of phenol, 90 g (1 mol) of dimethyl carbonate and 0.5 g of tributoxyethyl-tin at an internal temperature of 170° C. in the course of 55 hours, while a mixture consisting of methanol and dimethyl carbonate is distilled off over a 70 cm packed column at 75° to 88° C. After 3.4 mols of methanol have been separated off (according to gas chromatography), the excess dimethyl carbonate is distilled off in the course of 3 hours, initially at a temperature above the internal temperature and finally at 180° C., the pressure being reduced stepwise (from 400 to 100 mm Hg). The residue weighs 462 g.

50 g of the residue are converted into high molecular weight polycarbonate as described in Example 1. 20.1 g of a light-colored, clear polycondensation product with a similar pattern of properties to that in Example 1 are obtained. The molecular weight, measured by light scattering, is 39,500.

EXAMPLE 3

(Comparison Example without using phenol, according to DE-OS (German Published Specification) No. 2,736,062)

456 g (2 mols) of bisphenol A, 118 g (1 mol) of diethyl carbonate, 2 g of tributoxybutyl-tin and 200 g of xylene are heated under reflux using a 2 m high packed column, while stirring and passing over dry nitrogen, during which ethanol is taken off over the top at 78°–80° C. In the course of the reaction, 2 mols of diethyl carbonate are added in the middle of the column in a manner such that the bottom temperature is 168°–172° C. After 82 hours, 3.8 mols of ethanol have been separated off. Xylene, excess diethyl carbonate and a small amount of ethanol is distilled off at an internal temperature of 175°–180° C., while the pressure is reduced gradually to 18 mm Hg.

50 g of this resin are heated to 250° under 17 mm Hg as described in Example 1, accompanied by a stepwise reduction in the pressure until, after 4 hours, the splitting off of the volatile constituents has ended. After heating for a further hour to 270° under 0.03 mm Hg, the reaction has ended. 29.2 g of a light-colored, clear polycondensation product from which filaments can be drawn are obtained. The molecular weight, determined by the light scattering method, is 12,800.

What is claimed is:

1. In the process for the preparation of aromatic polycarbonates by the transesterification of diphenols and carbonic acid dialkyl ester, the improvement comprising the presence of
   (a) organo-tin-IV compound and
   (b) a monophenol.

2. The process of claim 1, wherein between 0.1 and 10 mols of said monophenols are present per mol of said diphenols.

3. The process of claim 1, wherein between 1 and 5 mols of monophenols are present per mol of said diphenols.

4. The process of claim 1 or 2 or 3, wherein said monophenol is a compound of the formula

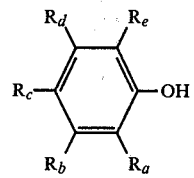

wherein $R_a$–$R_e$ independently denote a hydrogen, a chlorine atom or a methyl, ethyl, cyclohexyl or a phenyl radical.

5. The process of claim 4, wherein monophenol is selected from the group consisting of phenol, o-, m- or p-cresol, o-, m-, p-chlorophenol, o-, m-, p-ethylphenol, 2,6-dimethylphenol, p-cyclohexylphenol and p-phenylphenol.

6. The process of claim 1, wherein said carbonic acid dialkyl ester is dimethyl carbonate or diethyl carbonate.

7. The process of claim 1, wherein said diphenol is selected from the group consisting of bisphenol A, 2,2-bis-(4-hydroxyphenyl)-butane, 1,1-bis-(4-hydroxyphenyl)-cyclohexane, bis-(4-hydroxyphenyl)-ether and bis-(4-hydroxyphenyl)-sulphide.

8. Aromatic polycarbonate resin characterized by its molecular weight of between 20,000 and 180,000 prepared by the process of claim 1.

* * * * *